(12) United States Patent
Hummel (10) Patent No.: US 11,187,304 B2
(45) Date of Patent: Nov. 30, 2021

(54) GEARSHIFT TRANSMISSION FOR A MOTOR VEHICLE

(71) Applicant: AUDI AG, Ingolstadt (DE)

(72) Inventor: Steffen Hummel, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 1146 days.

(21) Appl. No.: 15/129,843

(22) PCT Filed: Aug. 2, 2014

(86) PCT No.: PCT/EP2014/002135
§ 371 (c)(1),
(2) Date: Mar. 27, 2018

(87) PCT Pub. No.: WO2015/149823
PCT Pub. Date: Oct. 8, 2015

(65) Prior Publication Data
US 2018/0283502 A1    Oct. 4, 2018

(30) Foreign Application Priority Data

Mar. 31, 2014    (DE) ..................... 10 2014 004 691.5

(51) Int. Cl.
*F16H 3/00* (2006.01)
*F16H 3/089* (2006.01)
*F16H 3/08* (2006.01)

(52) U.S. Cl.
CPC ............. *F16H 3/006* (2013.01); *F16H 3/089* (2013.01); *F16H 2003/007* (2013.01); *F16H 2003/0826* (2013.01); *F16H 2200/0078* (2013.01)

(58) Field of Classification Search
CPC .. F16H 3/006; F16H 3/089; F16H 2003/0826; F16H 2200/0078
(Continued)

(56) References Cited

U.S. PATENT DOCUMENTS 1,195,206 A * 8/1916 Goodspeed ............. F16H 3/006
74/359
3,175,411 A * 3/1965 McFarland ............. F16H 63/18
74/330

(Continued)

FOREIGN PATENT DOCUMENTS

CH      339503 A     6/1959
CN    101535679 A     9/2009
(Continued)

OTHER PUBLICATIONS

German Examination Report dated Feb. 18, 2015 in corresponding Application No. 10 2014 004 691.5; 5 pgs.
(Continued)

*Primary Examiner* — William C Joyce
(74) *Attorney, Agent, or Firm* — Maier & Maier, PLLC (57) ABSTRACT

A change-speed transmission for a motor vehicle. The transmission has a first and second subtransmission, which each have a plurality of shiftable gearwheel sets associated therewith. The subtransmissions each have an input shaft and have a joint output shaft. Each of the input shafts are activated alternatingly by, respectively, a first and a second powershift clutch. A reduction gearing effectuating a transmission change is associated with one of the subtransmissions, and the subtransmissions are alternatingly connected by way of a third powershift clutch.

17 Claims, 7 Drawing Sheets

(58) Field of Classification Search
USPC .......................................................... 74/330
See application file for complete search history.

(56) References Cited

U.S. PATENT DOCUMENTS

| | | | | |
|---|---|---|---|---|
| 3,389,614 | A * | 6/1968 | Shiber | F16H 3/095 |
| | | | | 74/330 |
| 3,991,634 | A * | 11/1976 | Longshore | F16H 3/085 |
| | | | | 74/745 |
| 4,132,133 | A | 1/1979 | Ballendux | |
| 4,610,177 | A * | 9/1986 | Mahoney | F16H 3/089 |
| | | | | 74/330 |
| 5,971,883 | A * | 10/1999 | Klemen | F16H 37/046 |
| | | | | 475/218 |
| 7,128,681 | B2 | 10/2006 | Sugino et al. | |
| 7,552,658 | B2 * | 6/2009 | Forsyth | F16H 3/006 |
| | | | | 74/329 |
| 7,695,390 | B2 * | 4/2010 | Phillips | F16H 37/0833 |
| | | | | 475/218 |
| 8,069,742 | B2 * | 12/2011 | Dittrich | F16H 61/702 |
| | | | | 74/330 |
| 8,857,284 | B2 * | 10/2014 | Kahl | F16H 3/006 |
| | | | | 74/330 |
| 9,382,975 | B2 * | 7/2016 | Robinette | F16H 3/006 |
| 10,363,806 | B2 * | 7/2019 | Yang | B60K 6/547 |
| 2005/0150318 | A1 | 7/2005 | Baldascini et al. | |
| 2008/0070742 | A1 * | 3/2008 | Phillips | F16H 37/0833 |
| | | | | 475/331 |
| 2012/0160044 | A1 | 6/2012 | Kahl et al. | |

FOREIGN PATENT DOCUMENTS

| | | |
|---|---|---|
| CN | 203035860 U | 7/2013 |
| CN | 103256351 A | 8/2013 |
| DE | 31237 A | 9/1964 |
| DE | 1225969 C2 | 4/1967 |
| DE | 2346116 A1 | 3/1975 |
| DE | 10232833 A1 | 2/2004 |
| EP | 1 837 553 A2 | 9/2007 |
| WO | 2011/031268 A1 | 3/2011 |

OTHER PUBLICATIONS

International Search Report dated Dec. 4, 2014 in corresponding Application No. PCT/EP2014/002135; 12 pgs.
International Preliminary Report on Patentability dated Jun. 10, 2016 in corresponding Application No. PCT/EP2014/002135; 33 pgs.
Chinese Office Action dated Feb. 24, 2018, in connection with corresponding CN Application No. 201480077286.1 (8 pgs.).
Notification of Transmittal of the English translation of the International Preliminary Report on Patentability dated Oct. 6, 2016, in connection with corresponding PCT Application No. PCT/EP2014/002135 (7 pgs.).
Machine translation of Chinese Office Action dated Sep. 7, 2018, in connection with corresponding CN Application No. 201480077286.1; 5 pages.

* cited by examiner

GEARSHIFT TRANSMISSION FOR A MOTOR VEHICLE

FIELD

The present invention pertains to a change-speed transmission for a motor vehicle according to the generic concept of patent claim 1.

BACKGROUND

Such change-speed transmissions are commonly referred to as dual clutch transmissions, and are often used in motor vehicles. Apart from their high degree of effectiveness, these transmissions have the advantage, among other things, of being shiftable, specifically shiftable automatically, without interrupting the tractive force, wherein a gear can already be preselected in the respective non-activated subtransmission, which is then activated by way of a change of the powershift clutches. In one possible application, in one subtransmission, the odd gears (1, 3, 5, etc.), and in the other subtransmission, the even gears (2, 4, 6, etc.), are expediently positioned by means of respective gearwheel sets, which are connected with the respective input shaft or output shaft, for instance by means of synchronous couplings.

As mentioned above, each of the subtransmission includes a respective powershift clutch. For instance, in a transmission with twelve forward gears (in other words: a 12-gear dual clutch transmission), a total of twelve wheel planes are needed. The reverse gear can be realized by means of a separate shaft. Traditionally, for shifting the forward gears, six shifting elements (in other words: synchronous couplings) are needed, in addition to one shifting element for the reverse gear. For the implementation of a shifting process, first, the respective gear is preselected. Then, the respective subtransmission with the gearwheel set for the preselected gear is activated by means of the closing of the powershift clutch. For changing gears, the activated coupling is opened, and simultaneously the passive powershift clutch is closed. Such a changing of gears is actually a subtransmission change. This means that in prior art, powershift transmissions (in other words: shifting without interrupting the tractive force) are only possible only by way of subtransmission changes. For instance, power shifting is only possible between even and odd gears.

In a very sporty vehicle, this leads to the following shifting sequence: To begin with, driving commences in first gear; then the second gear is preselected. Next, a gear change is performed from the subtransmission of the first gear to the subtransmission of the second gear. When the driver changes gears directly from the first gear to the third gear, at first, the subtransmission of the first gear is activated, then the subtransmission of the second gear, and then again the subtransmission of the first gear, since the latter also includes the third gear. In this shifting sequence, the length of stay in the subtransmission of the second gear is very short, which results in high component stress on the couplings.

From WO 2011/031268 A1, the use of a triple connector coupling in a transmission is known. The transmission is subdivided not into two, but into three separately, in other words, alternatingly operating subtransmissions, with one of the three powershift clutches of the triple connector couplings associated with each of the subtransmissions. It is therefore a common dual clutch transmission, extended with an additional subtransmission (including an associated powershift clutch).

U.S. Pat. No. 4,132,133 A shows a generic transmission with a first and a second subtransmission, in which the subtransmissions are connected with clutches and can be activated in a powershift transmission of one of the subtransmissions by shifting one of the powershift clutches, whereas the other subtransmission can be deactivated by shifting another powershift clutch. Furthermore, a reduction gearing effectuating a transmission change with a layshaft is envisioned, in which two interconnected spur gear wheels are positioned on top of the layshaft.

SUMMARY

The task of the invention is to develop the generic change-speed transmission such that allows for a greater degree of freedom in terms of functionality and in the layout of the gear steps in a structurally advantageous construction.

The problem definition is resolved by way of the characteristics of claim 1. Preferred further developments of the invention are disclosed in the subsidiary claims.

According to the invention, the conventional dual powershift clutch unit of a conventional dual clutch transmission known from prior art is extended to a triple powershift clutch unit, in which the transmission features an additional gear step which can be connected by means of a third powershift clutch. The third powershift clutch is part of the powershift unit, together with the first and the second powershift clutches. According to patent claim 1, the additional gear step is a reduction gearing associated with or subordinated to the first subtransmission or the second subtransmission, respectively, where it effectuates a transmission change. The reduction gearing can be connected alternatingly via the third powershift clutch.

Other than in the aforementioned transmission from WO 2011/031268 A1, the transmission here still has only two subtransmissions, operating alternatingly like a conventional dual clutch transmission. With the additional third powershift clutch of the triple connector clutch, one of the two subtransmissions can be connected to the drive train in a different way.

This leads to the two following material advantages: The total number of wheel planes can be reduced. This also applies to the number of the shifting elements (in other words: synchronous clutches). Moreover, the number of the required gear actuators is reduced as well. Furthermore, in the subtransmission with the reduction gearing, the gearwheel sets positioned there can be used dually, which leads to a variety of gear steps that can be realized, all of which can be powershifted via the now two powershift clutches of this subtransmission. One coupling only is closed at any time. Furthermore, in this subtransmission, gear shifts deviating from the common gear sequences are possible, allowing, for instance, for the skipping of a gear, or for alternative transmission layouts. For instance, after driving commences in the 1st gear, under certain defined operating conditions of the motor vehicles, the 2nd gear might be skipped, and the 3rd gear might be activated instead, without interrupting the tractive force and without preselecting another gear.

According to the invention, the reduction gearing is embodied at least by spur gear wheels, positioned on the input shaft and on the output shaft, specifically with two axially adjoining gearwheel sets, of which the spur gear wheels positioned on the output shaft are interconnected, the input spur gear wheel is positioned solidly on a third party input shaft of the powershift clutch, and the output spur gear wheel is positioned solidly on the input shaft of the corresponding subtransmission. This results in an axially compact, robust, and advantageously effective construction of the change-speed transmission.

Furthermore, the three powershift clutches can be arranged coaxially with the three input shafts of the transmission and assembled into a coupling unit which might, for example, be integrated into the transmission, which can be alternatingly electrohydraulically charged.

Furthermore, the subtransmissions may be subdivided into even and odd gears in the familiar way, the reduction gearing being associated with the subtransmission with the odd gear for instance in order to allow for the skipping of a gear when the motor vehicles is accelerating. Preferentially, the transmission change of the reduction gearing may be designed such that the odd gears 1, 5, and possibly 9, et seq. can be operated via the reduction gearing, with a closed third coupling K3, whereas the gears 3, 7, and possibly 11 et seq. can be operated directly, without the reduction gearing and with a closed coupling K2. In other words: shifting from first gear to third gear, for instance, is possible without a need for preselecting a gear.

In an advantageous further development of the invention, an additional reduction gearing may be integrated into the subtransmission with the even gears, which can be bridged or connected by means of shift couplings. Therefore, gearwheel sets may also be dually used in the second subtransmission, which adds more gear steps for fewer gearwheel sets. It is obvious that fewer gearwheel sets also allows for a reduction of the number of synchronous couplings and gear actuators.

Specifically, the additional reduction gearing may also consist of two spur gearwheel sets, of which the input spur gear wheel can be connected to the first input shaft, of which the spur gear wheels positioned on the output shaft are interconnected, and whose output spur gear wheel is affixed on a hollow shaft positioned on the input shaft and carrying shifting gear wheels. However, the invention is not limited to this specific configuration. Rather, the shifting gear wheels are not necessarily arranged on the hollow shaft; the fixed gearwheels may be arranged on the hollow shaft as well.

The spur gear wheels of the reduction gearing positioned on the output shaft can advantageously be connected with the output shaft directly via a shift coupling, thereby performing a second function of directly forming structurally advantageous two gearwheel sets. This structural design is applicable to both reduction gearings.

In a particularly advantageous further development of the invention, the spur gear wheels of the reduction gearing associated with subtransmission that are positioned on the output shaft can be connected directly with the output shaft by way of a shift coupling as well, thereby allowing for a further reduction of the gearwheel sets required for a specific number of gears of the change-speed transmission.

Consequently, for three shift couplings (synchronous couplings) on the joint output shaft and a shift coupling (synchronous coupling) on the input shaft of a first subtransmission, up to 12 forward gears can be alternatingly shiftable via the three couplings K1, K2, K3.

In conclusion, in a preferred embodiment of the invention for motor vehicles with all wheel drive, the joint output shaft can drive via an interaxle differential to a rear and to a front axle differential of the motor vehicle. In a constructive realization, viewed in the axial direction, the subtransmissions can be arranged between the powershift clutches K1, K2, K3 and the interaxle differential.

The powershift unit may feature a drum-shaped coupling housing which is connected in a torque-proof connection with a driving section of the shaft. Within of the drum-shaped coupling housing, coupling heads are envisioned, which are connected in a torque-proof connection with the respective input shafts. The coupling heads may interlock via coupling blades with the drum-shaped coupling housing.

BRIEF DESCRIPTION OF THE DRAWINGS

Multiple exemplary embodiments of the invention are explained below in detail, based on the appended schematic drawing. Shown embodiments are.

DETAILED DESCRIPTION OF THE DRAWINGS

Figure 1:
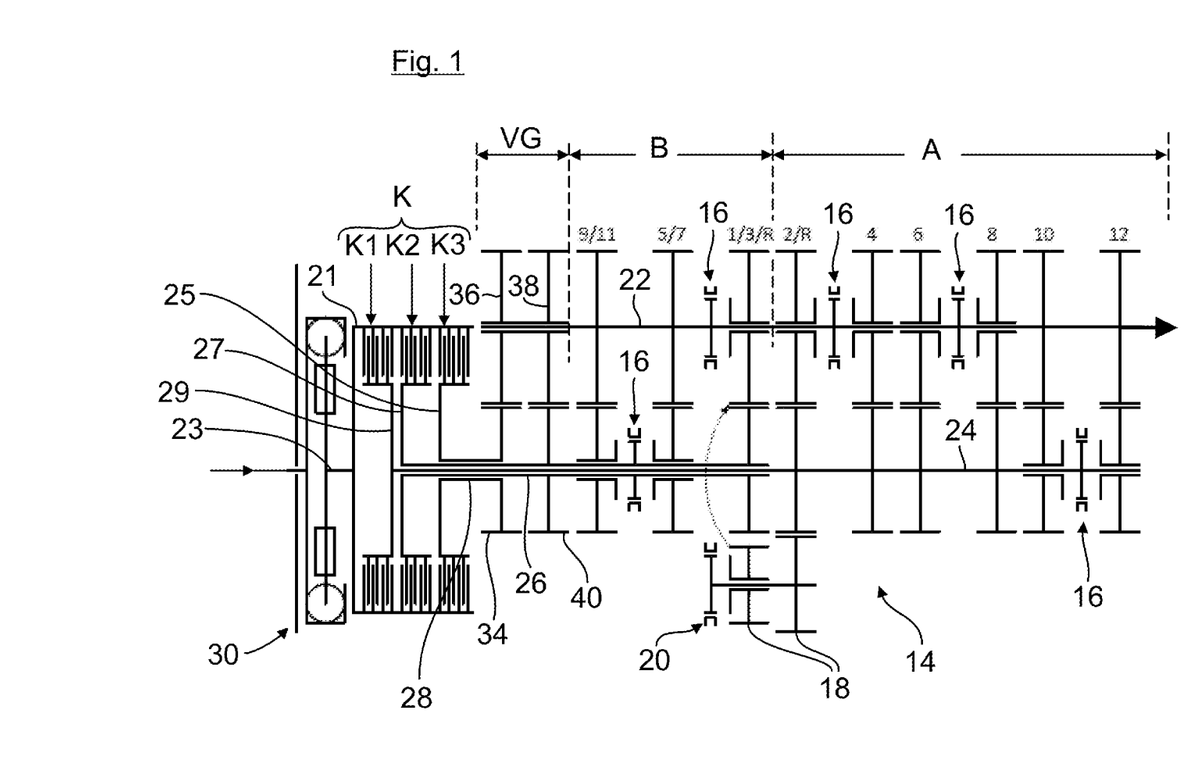
FIG. 1 a change-speed transmission for motor vehicles with three powershift clutches and two downstream subtransmission, one of which is combined with a reduction gearing.

FIG. 1 shows a block diagram of a change-speed transmission 14 for motor vehicles, featuring twelve forward gears 1 through 12 in this exemplary embodiment, and a total of three reverse gears R formed by mutually enmeshed gearwheel sets, wherein the gearwheel sets are shiftable in a familiar manner via shift couplings or synchronous couplings (uniformly marked with ref. no. 16) in the idler gearwheels.

The gearwheel sets with the fixed gearwheels and the shiftable idler gearwheels are subdivided into two subtransmissions A and B, wherein the odd-numbered forward gears (from left to right in the drawing) 9/11, 5/7, and 1/3 are associated with subtransmission B, whereas via subtransmission A, the even-numbered gears 2, 4, 6, 8, 10, and 12 are shiftable via a corresponding number of gearwheel sets.

A total of three reverse gears R are shiftable in FIG. 1 via the clutches K1, K2, and K3. The reverse gears R, which differ from each other in transmission, can be shifted via the gearwheel sets 1/3/R in subtransmission B or via sets 2/R in subtransmission A by interconnecting two reversing gear wheels 18 (shown in the drawing as folded into the drawing plane) via a synchronous clutch 20, and activating them by closing one of the synchronous clutches 16 of the 1st or 2nd forward gear. In a technical realization, both the reverse gear (with shifted powershift clutch K1) and the first gear are engaged simultaneously, and therefore only a reverse gear is realized.

The gearwheel sets for the said forward gears 1 through 12 are arranged on the joint output shaft 22 and on three input shafts 24, 26, 28 of the change-speed transmission 14, wherein the coaxial input shafts 26, 28 are correspondingly embodied radially as hollow shafts above the continuous input shaft 24.

The input shafts 24, 26, 28 are each connected with a powershift clutch K1, K2, K3, which are assembled to form a coupling unit K. The coupling unit K may be driven, for instance, by an internal combustion engine via a torsional vibration damper 30. The couplings K1, K2, K3 can be closed alternatingly by way of an electrohydraulic transmission controller, not shown here.

According to FIG. 1, the powershift unit or coupling unit K may feature a drum-shaped coupling housing 21, connected in a torque-proof connection with a driving section of the shaft 23. Within of the drum-shaped coupling housing 21, coupling heads 25, 27, and 29 are envisioned, respectively connected in a torque-proof connection to the input shafts 24, 26, 28. The coupling heads 25, 27, 29 can be made to interlock alternatingly with the drum-shaped coupling housing 21 via coupling blades.

The input shaft 24 of the subtransmission A is driven via the closed coupling K1, whereas the coupling K2 operates on the input shaft 26 of the subtransmission B.

The coupling K3, in its closed position, drives the input shaft 28, which is connected to a reduction gearing VG, which provides for two gear steps in the subtransmission B. The reduction gearing VG features an input spur gear wheel 34 on the input shaft 28, two axially adjoining and interconnected spur gear wheels 36, 38 on the output shaft 22, and finally, an output gearwheel 40 affixed on the input shaft 26. Structurally, the reduction gearing VG is integrated into the subtransmission B.

The reduction gearing VG features a transmission different from 1:1, for instance a downshifting transmission by two gear steps, so that in the subtransmission B, the gears 3, 7, 11 are shiftable directly via the respective gearwheel sets via the coupling K2 and the respective synchronous coupling 16, and when coupling K3 is closed, via the reduction gearing VG and the same gearwheel sets of the gears 1, 5, 9.

Figure 2:
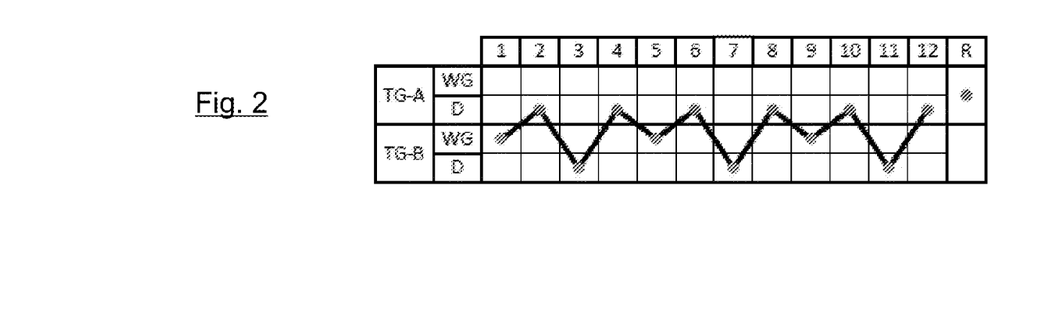
FIG. 2 a shift matrix of the change-speed transmission according to FIG. 1.

This is shown, for instance, in the shift matrix in FIG. 2, in which the activated subtransmission A or B is shown for the respective forward gears 1 through 12, and the shifting position D (=directly above the clutch K2) or WG (power flow via the clutch K3 and the reduction gearing VG) is shown for the subtransmission B.

As can be seen in the shift matrix, the subtransmission B (TG-B) and the reduction gearing VG (WG) are activated in the 1st gear when clutch K3 is closed. The power flow proceeds from the clutch K3 and the input shaft 28 to the reduction gearing VG, and from there via the input shaft 26 and the gearwheel set 1/3 to the output shaft 22, which may, for instance, drive a rear axle differential of the motor vehicles via a cardan shaft, not shown here. The corresponding synchronous clutch 16 on the output shaft 22 is closed here.

If the 2nd gear is to be engaged, the corresponding synchronous coupling 16 in the subtransmission A can be closed via the actuator of the transmission controller, not shown here.

Then, without interrupting the tractive force, the 2nd gear in the subtransmission A (cf. FIG. 2, TG-A, D) can be activated by opening the coupling K3 and simultaneously closing the coupling K1.

The 3rd gear is activated via the gearwheel set 1/3, which is still engaged, by way of opening the coupling K1 and simultaneously closing the coupling K2. The internal combustion engine in the subtransmission B directly drives the gearwheel set 1/3 via the coupling K2 (cf. FIG. 2, TG-B, D) (through circumventing the reduction gearing VG).

Via the third coupling K3 and the reduction gearing VG, in specific operating situations, it is also possible to shift via the transmission controller from the 1st gear in the subtransmission B to the 3rd gear of the subtransmission B. This only requires the opening of the coupling K3 in the 1st gear, for instance, and the simultaneous closing of the coupling K2 for the 3rd gear.

The further shifting processes can be done as shown in the shift matrix according to FIG. 2. When upshifting or when backshifting the gears 1/3, 5/7, and 9/11, even-numbered gears can be skipped if necessary, as described above. The above notwithstanding, shifting is still done without interrupting the tractive force within the subtransmission B.

FIG. 3 through 10 show additional exemplary embodiments of the invention, in which functionally identical parts are marked with the same reference numbers, and only the respective material differences between them and FIGS. 1 and 2 are described.

Figures 3, 4:
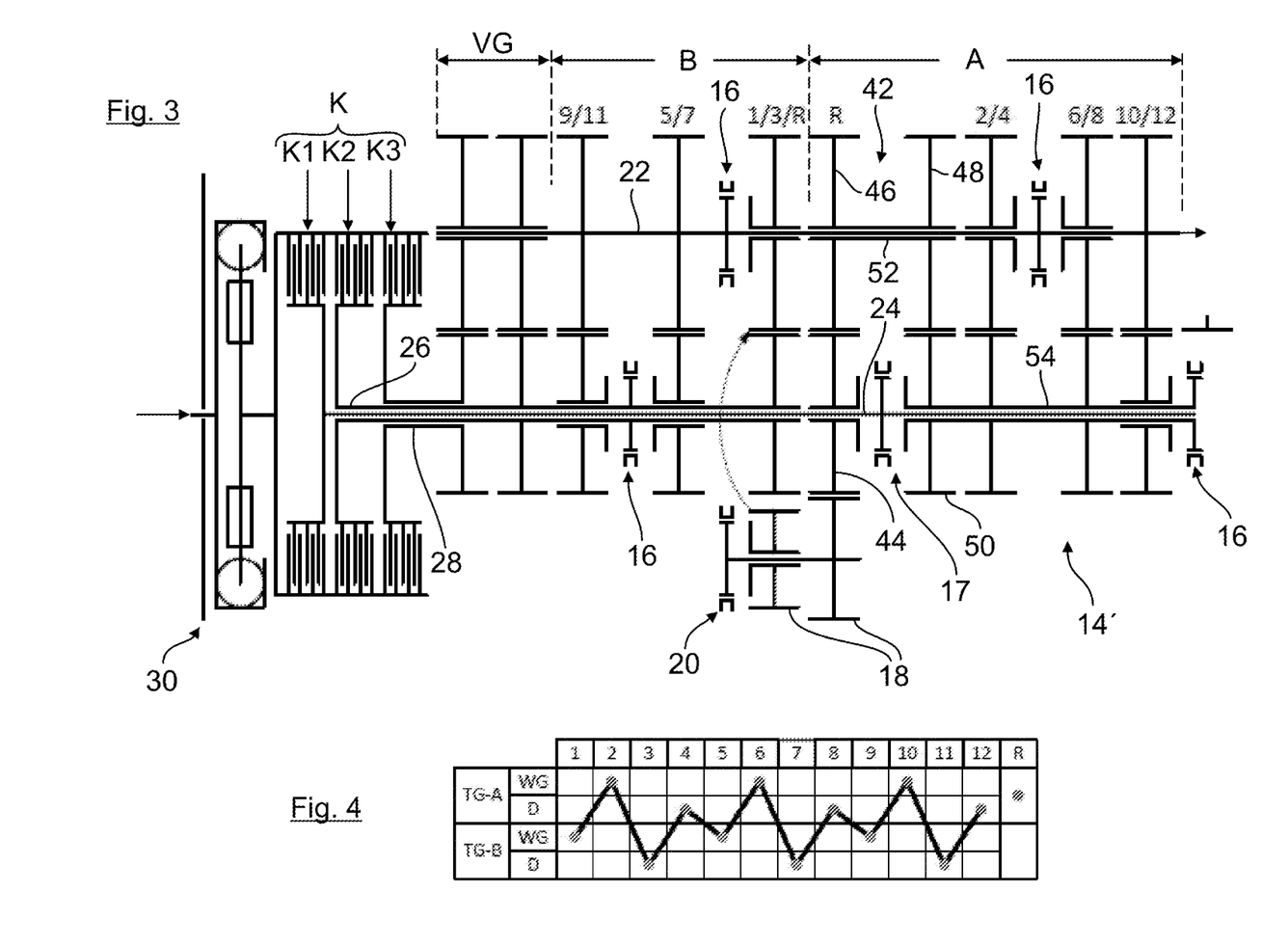
FIG. 3 an additional change-speed transmission according to FIG. 1, but with an additional reduction gearing, integrated into the second subtransmission.
FIG. 4 a shift matrix of the change-speed transmission according to FIG. 3.

According to FIGS. 3 and 4, a reduction gearing 42 is also integrated into the change-speed transmission 14' or in its subtransmission A, with a driving idler gearwheel 44, two interconnected fixed gearwheels 46, 48 positioned on a hollow shaft 5, and a fixed output gearwheels 50 on an additional hollow shaft 54. The hollow shaft 52 is positioned here on the output shaft 22, and the hollow shaft 54 with fixed gearwheels of the gearwheel sets 2/4 and 6/8 is positioned on the input shaft 24 of the change-speed transmission 14', such that they can rotate freely.

The gearwheel set 10/12 of the subtransmission A features a fixed gearwheel on the output shaft 22 and a shiftable idler gearwheel on the hollow shaft 54, which can be connected with the hollow shaft 54 by way of a synchronous coupling 16.

The spur gear wheel 44 of the reduction gearing 42 or the hollow shaft 54 can be connected with the input shaft 24 by way of an additional synchronous coupling 16; the same applies for the two gearwheel sets 2/4 and 6/8, which can be connected with the output shaft 22 by way of a synchronous coupling 16 as well.

By means of the synchronous coupling 16 on the input shaft 24, the reduction gearing 42 can be activated either by coupling the drive gear wheel 44, such that it powers the hollow shaft 54 via the gear wheels 44, 46, 48, 50, or alternatively, the hollow shaft 54 might be powered directly by shifting the synchronous coupling 16. In a corresponding transmission layout of the reduction gearing 42 alternative to 1:1, the gearwheel sets 2/4, 6/8, 10/12 may be dually used.

By way of the bridgeable reduction gearing 42, whose gear wheels 44, 46 can simultaneously form a reverse gear R in combination with the reversing gearwheels 18 as shown, transmission operation may also be reduced correspondingly in the subtransmission A through dual use of the gearwheel sets.

FIG. 4 shows an exemplary shift matrix of the change-speed transmission 14', in which the shifting positions D (=direct power flow without reduction gearing VG or 42) and WG (with reduction gearing VG or 42) are shown in the subtransmission A (TG-A) and in the subtransmission B (TG-B). For instance, the power flow in the subtransmission A in the 2nd gear proceeds to the hollow shaft 54 via the reduction gearing 42, and in the 4th gear it proceeds to the hollow shaft 54 directly, meaning, by bridging the reduction gearing 42. The respective shift-gear sets may be preselected correspondingly via the synchronous couplings 16.

Figure 5A:
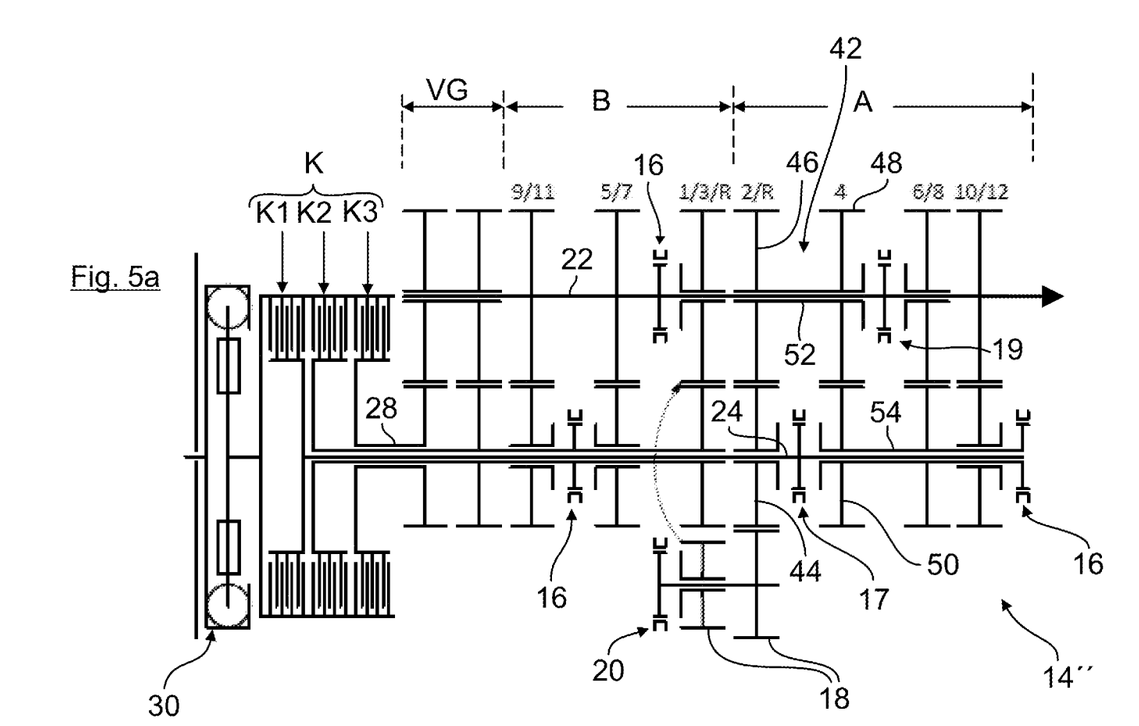
FIG. 5a a change-speed transmission alternative to the one in FIG. 3, in which the integrated reduction gearing is also shiftable as a gearwheel set.
Figure 5B:
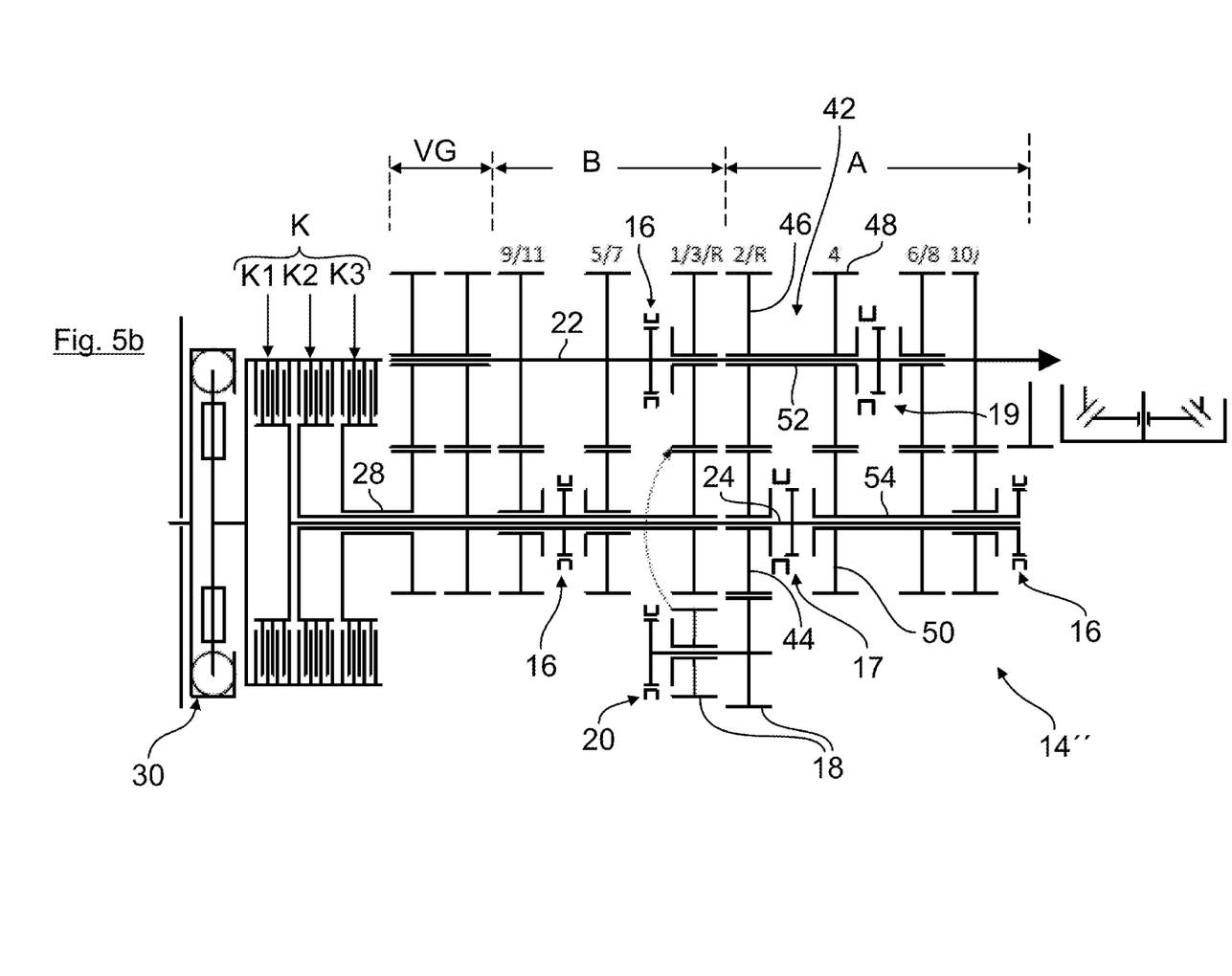
FIG. 5b a change-speed transmission alternative to the one in FIG. 3, in which the integrated reduction gearing is also shiftable as a gearwheel set.
Figure 5C:
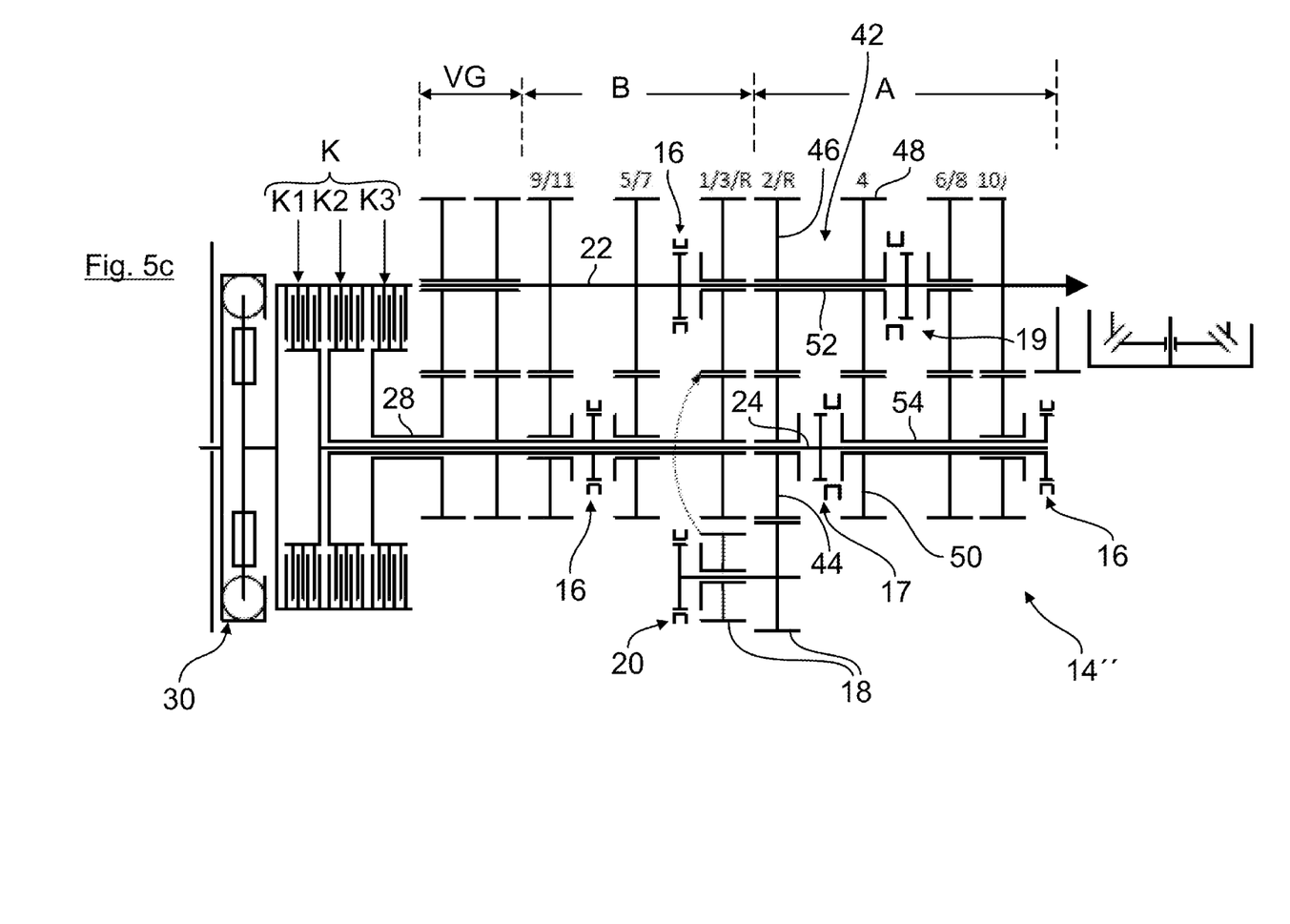
FIG. 5c a change-speed transmission alternative to the one in FIG. 3, in which the integrated reduction gearing is also shiftable as a gearwheel set.

FIGS. 5a through 5c show an additional change-speed transmission 14", which deviates from FIG. 3 as follows for the purpose of saving a gearwheel set in the subtransmission A:

According to FIG. 5a, the transmission of the gear wheels of the reduction gearing 42 is embodied such that its spur gearwheel sets 44, 46 and 48, 50 may simultaneously form the gearwheel sets 2/R and 4. The gearwheel set 2/4 shown in FIG. 3 can accordingly be omitted. In FIG. 5a, a shift coupling 19 is arranged on the output shaft 22 which can be connected with the reduction gearing hollow shaft 52, on which the fixed gearwheels 46, 48 are arranged. In the alternative, the shift coupling 19 on the output shaft 22 can be connected with the idler gearwheel of the gearwheel set 6/8.

The reduction gearing drive gear wheel 44 can be connected via the shift coupling 17 on the input shaft 24: in this case, the reduction gearing 42 is activated, and drives the gearwheel sets 6/8 or 10/12 of the subtransmission A via the hollow shaft 54.

FIG. 5b shows the configuration when the 4th gear is activated. In this case, the shift coupling 17 on the input shaft 24 is connected with the reduction gearing drive gear wheel 44. Furthermore, the shift coupling 19 on the output shaft 22 is connected with the reduction gearing hollow shaft 52. This means that the fixed gearwheel 46 arranged on the reduction gearing hollow shaft 52 is directly connected with the output shaft 22, and the 2nd gear is engaged correspondingly. The force flow in the 2nd gear proceeds from the input shaft 24 via the shift coupling 17, the reduction gearing drive gear wheel 44, the reduction gearing spur gear wheel 46, the hollow shaft 52, and the shift coupling 19, to the output shaft 22.

FIG. 5b shows the configuration when the 4th gear is activated. Consequently, the shift coupling 17 on the input shaft 24 connects the reduction gearing fixed output gearwheel 50. As with the transmission of the 2nd gear, the shift coupling 19 on the output shaft 22 connects the reduction gearing hollow shaft 52. This means that the fixed gearwheel 48 arranged on the reduction gearing hollow shaft 52 is directly connected with the output shaft 22, and the 4th gear is engaged correspondingly. The force flow in the 4th gear proceeds from the input shaft 24 via the shift coupling 17, the reduction gearing output gear wheel 50, the reduction gearing spur gear wheel 48, and the shift coupling 19, to the output shaft 22.

Figure 7:
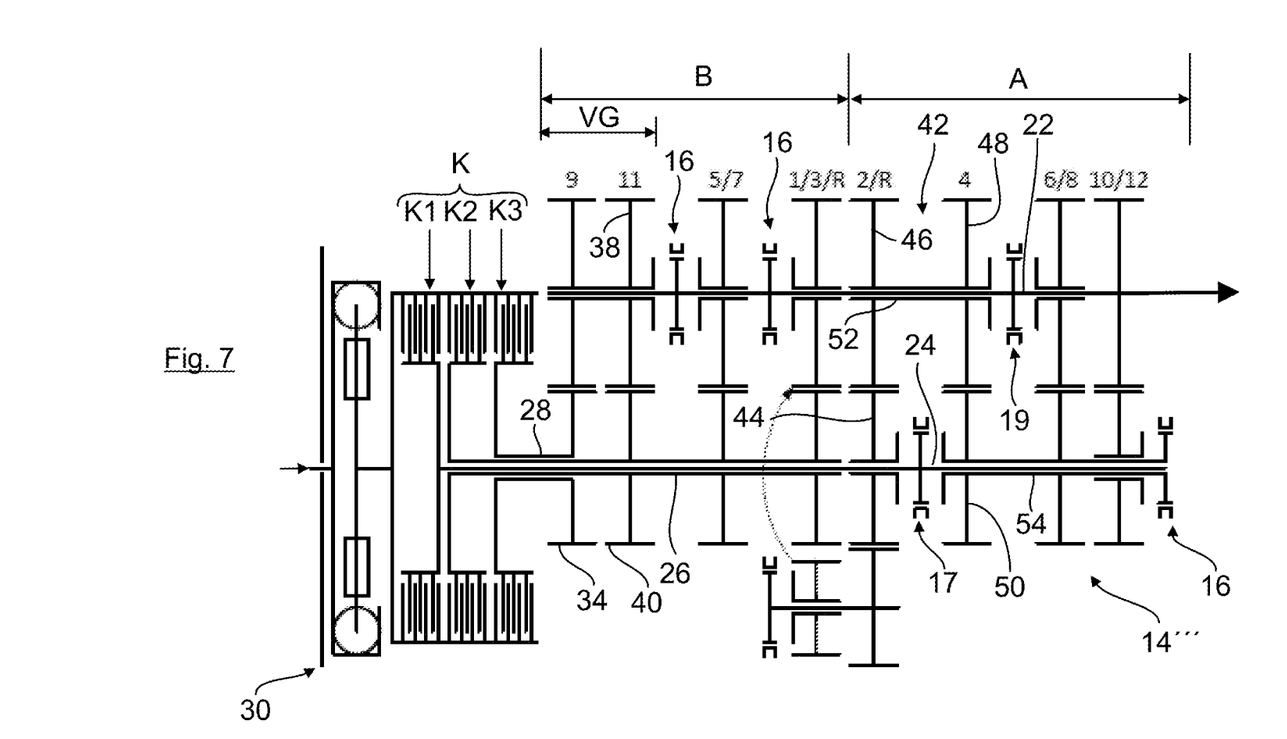
FIG. 7 an additional change-speed transmission according to FIG. 1, 3, or 5, in which the reduction gearing associated with the first subtransmission can also be used as a gearwheel set.

In FIG. 5, as also in FIGS. 1, 3, and 7, the 1st gear and the 3rd gear can be activated by way of a joint gearwheel set 1/3 in the subtransmission B. In specific driving situations (for instance when accelerating after standing still at a red light), shifting the powershift clutches K3 to K2 within the subtransmission B allows for shifting directly from the 1st gear to the 3rd gear, without a need for preselecting the second gear in the subtransmission A.

Such direct upshifting from the 1st gear to the 3rd gear solves the following problem, which is known from conventional dual clutch transmissions: In such a conventional dual clutch transmission, a direct upshifting from the 1st gear to the third gear is not possible. Instead, when the 1st gear in the first subtransmission is engaged, the 2nd gear in the second subtransmission must be preselected. Subsequently, when the 2nd gear in the second subtransmission is engaged, the 3rd gear in the first subtransmission must be preselected. In this particular driving situation (accelerating after standing still at a red light), under certain conditions, the length of stay in the 2nd gear may be very short, and insufficient to allow for a preselection of the third gear. Accordingly, this can cause a delay in upshifting to the 3rd gear.

The reduction gearing 42 in FIG. 5, apart from its downshifting (or upshifting) function, therefore also forms the gearwheel sets of the 2nd and 4th forward gear.

Figure 6:
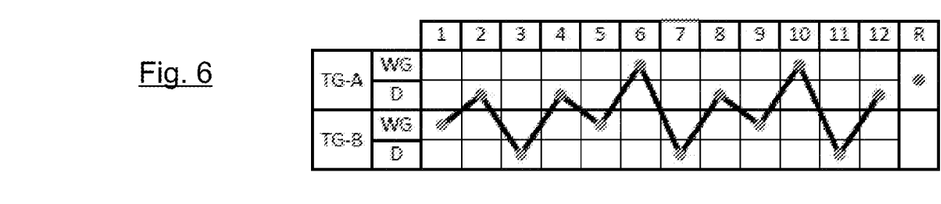
FIG. 6 a shift matrix of the change-speed transmission according to FIG. 5.

FIG. 6 shows another exemplary shift matrix for the realization of 12 forward gears, including the reduction gearing VG (WG) or the direct drive shafts (D) in the subtransmissions A and B (TG-A, TG-B).

FIG. 7 shows an additional modification of the change-speed transmission 14''' with respect to the subtransmission B or its reduction gearing VG, which now also represents gear wheels.

Figure 8:
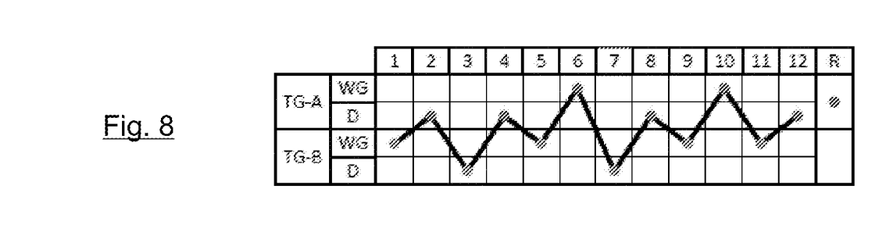
FIG. 8 a shift matrix of the change-speed transmission according to FIG. 7.

The reduction gearing VG with its gearwheel sets 34, 36 and 38, 40 is designed here in such a way, as compared to FIG. 1, that given correspondingly designed transmission ratios, the said gearwheel sets may form the forward gears 9 and 11 by being alternatingly shiftable directly via the axially adjoining synchronous coupling 16 on the output shaft 22. As a result, the separate gearwheel set 9/11 according to FIG. 1 can be omitted. An exemplary shift matrix for these purposes is shown in FIG. 8.

Figure 9:
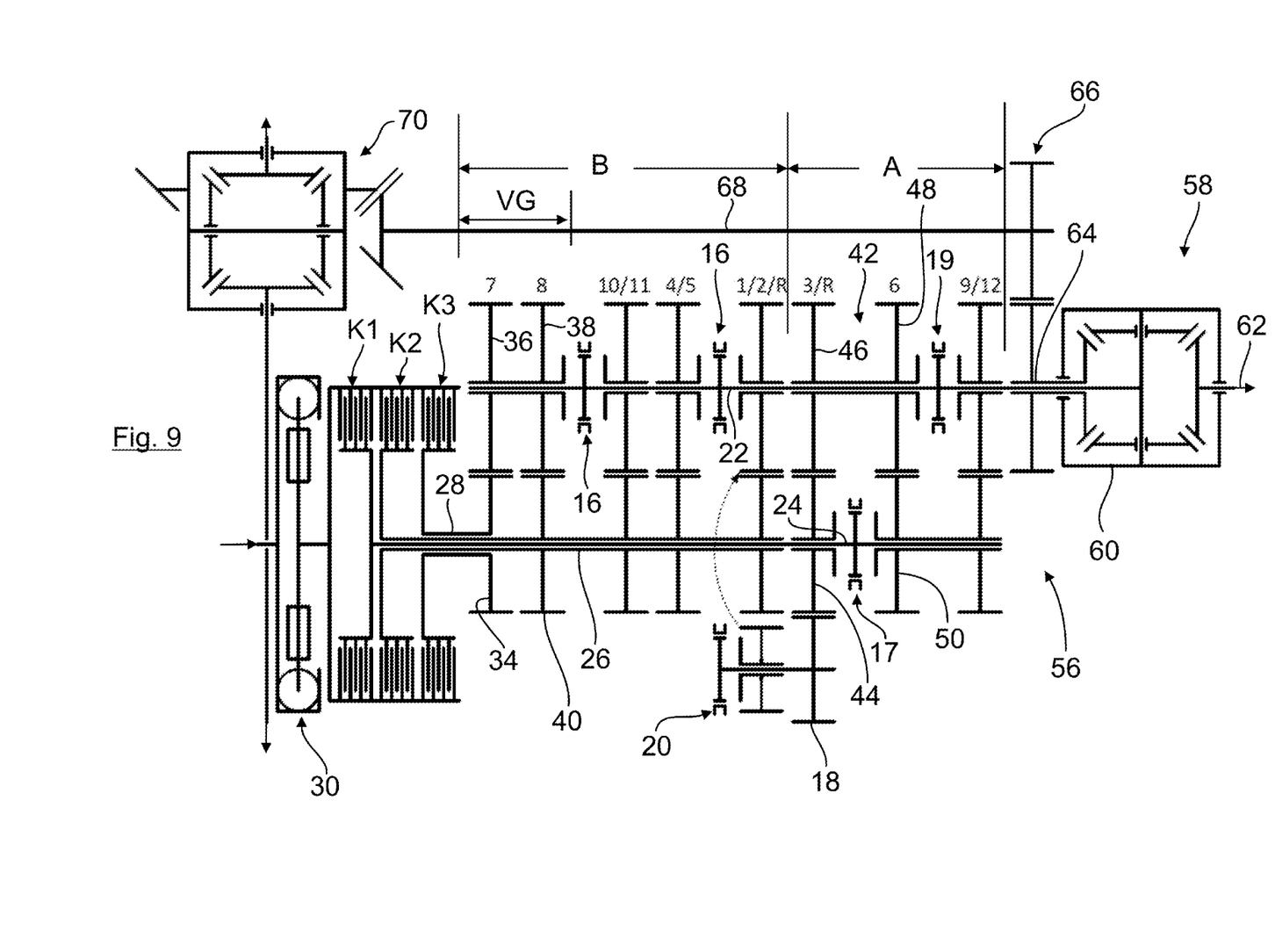
FIG. 9 a change-speed transmission for a motor vehicle with all-wheel drive alternative to the ones in the aforementioned figures, which has only three shift couplings on the output shaft and a shift coupling on one of the input shafts for shifting between up to 12 forward gears.

FIG. 9 shows a change-speed transmission 56 for all-wheel drive motor vehicles, of which only the relevant differences are described.

The joint output shaft 22 of the subtransmission A and B drives the differential housing 60 of an interaxle differential 58 here, of which one divided-performance half shaft 62 may be connected with a rear axle differential by way of a cardan shaft, whereas the second hollow half shaft 64 drives a front axle differential 70 of the motor vehicle by way of a spur gear drive 66 and a drive shaft 68. The differentials 58 and 70 are preferentially integrated into the change-speed transmission 56.

Alternative to FIG. 7, in the subtransmissions A and B, the odd-numbered and even-numbered forward gears are arranged in the following order (from left to right in the drawing):

In the subtransmission B, these are the gears 7, 8, 10/11, 4/5, and 1/2/R, and in the subtransmission A, these are the gears 3/R, 6, and 9/12, which are shiftable correspondingly.

By way of the shown configuration of the reduction gearings VG and 42, the additional powershift clutch K3, and the gear wheel sets, it is possible to shift all forward gears 1 through 12 automatically with only three synchronous couplings 16, 16, 19 on the output shaft 22 and a synchronous coupling 17 on the continuous input shaft 24 without interrupting the tractive force, as described above with FIG. 1.

Other than in the previous exemplary embodiments, in FIG. 9, the gear steps are distributed such that adjacent gear steps can be activated by way of a respective joint gearwheel set (10/11, 4/5, and 1/2) without a subtransmission change, but rather within the subtransmissions B.

In FIG. 9, the direct upshifting from the 1st gear to the 3rd gear as previously described is made possible. Contrary to FIG. 5, for instance, in FIG. 9, the direct upshifting from the 1st to the 3rd gear is linked with a subtransmission change. Moreover, in the subtransmission B, it is possible to shift directly from the 1st gear to the 2nd gear by shifting the powershift clutches K3 to K2, without a need for preselecting the 2nd gear in the subtransmission A. The same is also true for the gear step pairings 7 and 8, 10 and 11, and 4 and 5. Furthermore, FIG. 9 also allows for direct shifting from the 12th gear (in the subtransmission A), not only to the 11th gear (in the subtransmission B), but also to the 10th gear (also in the subtransmission B).

The invention is not limited to the exemplary embodiments described. Specifically, there may be fewer than the envisioned forward gears 1 through 12, and a corresponding omission of the respective gearwheel sets and synchronous couplings.

The invention claimed is:

1. A change-speed transmission for a motor vehicle, comprising:
    a plurality of subtransmissions, the plurality of subtransmissions comprising a first subtransmission and a second subtransmssion;
    a plurality of shiftable gearwheel sets associated with the first subtransmission and the second subtransmission;
    a powershift unit having a plurality of powershift clutches, the plurality of powershift clutches comprising a first powershift clutch and a second powershift clutch;
    a joint output shaft;
    a plurality of input shafts, the plurality of input shafts comprising a first input shaft associated with the first subtransmission and operationally coupling the first subtransmission to the first powershift clutch and with the joint output shaft, and a second input shaft associated with the second subtransmission and operationally coupling the second subtransmission to the second powershift clutch and with the joint output shaft;
    wherein a subtransmission in the plurality of subtransmissions is configured to be activated by shifting a powershift clutch in the plurality of powershift clutches, the shifting of the powershift clutch in the plurality of powershift clutches comprising a powershift transmission step, the powershift transmission step comprising shifting without interrupting the tractive force;
    wherein a subtransmission in the plurality of subtransmissions is configured to be deactivated by shifting a powershift clutch in the plurality of powershift clutches;
    further comprising an additional gear step configured to be connected with a third powershift clutch in the plurality of powershift clutches, the additional gear step comprising a reduction gearing configured to effectuate a transmission change, the reduction gearing being associated with a subtransmission in the plurality of subtransmissions;
    wherein the reduction gearing comprises two axially adjoining gearwheel sets, a first axially adjoining gearwheel set comprising a driving spur gear wheel and a linking spur gear wheel, a second axially adjoining gearwheel set comprising a linking spur gear wheel and an output spur gear wheel, the linking spur gear wheel from the first axially adjoining gearwheel set being interconnected with the linking spur gear wheel from the second axially adjoining gearwheel set, the interconnecting linking spur gear wheels being disposed on a reduction gearing hollow shaft coaxial to the output shaft;
    wherein the driving spur gear wheel is affixed to a third input shaft, the third input shaft being operationally coupled with the third powershift clutch; and
    wherein the output spur gear wheel is affixed to the input shaft of a subtransmission in the plurality of subtransmissions.

2. The change-speed transmission according to claim 1, wherein the first, second, and third powershift clutches are arranged coaxially with the first, second, and third input shafts.

3. The change-speed transmission according to claim 1, wherein the output spur gear wheel is affixed to the input shaft of the second subtransmission.

4. The change-speed transmission according to claim 3, further comprising an additional reduction gearing integrated into the first subtransmission; and
    wherein the additional reduction gearing is operationally linked to a shifting clutch disposed on the first input shaft.

5. The change-speed transmission according to claim 4, wherein the additional reduction gearing comprises two additional spur gearwheel sets, a first additional spur gearwheel set comprising a driving spur gear wheel and a linking spur gear wheel, a second spur gearwheel set comprising a linking spur gear wheel and an output spur gear wheel;
    wherein the linking spur gear wheels of each of the additional spur gearwheel sets are interconnected and disposed on an additional reduction gearing hollow shaft coaxial to the output shaft; and
    wherein the output spur gear wheel of the second additional spur gearwheel set is affixed on a hollow shaft positioned on the first input shaft, the hollow shaft positioned on the first input shaft supporting a plurality of shifting gear wheels.

6. The change-speed transmission according to claim 5, wherein the linking spur gear wheels of each of the additional spur gearwheel sets that are positioned on the output shaft are configured to be directly connectable to the output shaft by a shifting clutch disposed on the output shaft, thereby forming a second and fourth gear step.

7. The change-speed transmission according to claim 6, wherein the shifting clutch of the first input shaft is configured to be connected to the driving spur gear wheel of the additional reduction gearing;
    wherein the shifting clutch of the output shaft is configured to be connected with the additional reduction gearing hollow shaft; and
    wherein the change-speed transmission is configured such that, in order to engage a second gear, the shifting clutch of the input shaft is connected with the driving spur gear wheel of the additional reduction gearing and wherein the shifting clutch of the output shaft is connected with the additional reduction gearing hollow shaft.

8. The change-speed transmission according to claim 6, wherein the shifting clutch of the first input shaft is configured to be connected to the output spur gear wheel of the additional reduction gearing;
    wherein the shifting clutch of the output shaft is configured to be connected with the additional reduction gearing hollow shaft; and
    wherein the change-speed transmission is configured such that, in order to engage a fourth gear, the shifting clutch of the first input shaft is connected with the output spur gear wheel of the additional reduction gearing and wherein the shifting clutch of the output shaft is connected with the additional reduction gearing hollow shaft.

9. The change-speed transmission according to claim 1, wherein the reduction gearing is configured to effectuate a transmission change such that a first gear step and a fifth gear step can be operated via the reduction gearing and while maintaining a closed clutch, and such that a third gear step and a seventh gear step can be operated directly without the reduction gearing and while maintaining the closed clutch.

10. The change-speed transmission according to claim 9, wherein the reduction gearing is further configured to effectuate a transmission change such that a ninth gear can be operated via the reduction gearing and while maintaining a closed clutch, and such that an eleventh gear can be operated directly without the reduction gearing and while maintaining a closed clutch.

11. The change-speed transmission according to claim 1, wherein three shifting clutches are disposed on the joint output shaft;
   wherein a shifting clutch is disposed on the input shaft of the first subtransmission; and
   wherein up to twelve forward gears are configured to be shiftable by manipulation of the three powershift clutches.

12. The change-speed transmission according to claim 1, wherein the joint output shaft is configured to drive a differential housing of an interaxle differential; and
   wherein each of the subtransmissions in the plurality of subtransmissions are arranged, in an axial direction, between the plurality of powershift clutches and the interaxle differential.

13. The change-speed transmission according to claim 1, wherein the change-speed transmission is configured to allow shifting through a plurality of gears, the plurality of gears comprising even-numbered gears and odd-numbered gears; and
   wherein the even-numbered gears are associated with the first subtransmission, and the odd-numbered gears are associated with the second subtransmission.

14. The change-speed transmission according to claim 13, wherein the output spur gear wheel is affixed to the input shaft of the second subtransmission;
   wherein the second subtransmission comprises a joint gearwheel set corresponding to a first gear and a third gear;
   wherein the first gear and the third gear are configured to be activated by the operation of the joint gearwheel set;
   wherein the change-speed transmission is configured to be shifted from the first gear directly to the third gear by shifting the third powershift clutch to the second powershift clutch within the second subtransmission without a subtransmission change and without selecting a second gear; and
   wherein the second gear is associated with the first subtransmission.

15. The change-speed transmission according to claim 1, wherein the change-speed transmission is configured to allow shifting through a plurality of gears, the plurality of gears comprising even-numbered gears and odd-numbered gears; and
   wherein the even-numbered gears and the odd-numbered gears are associated with each of the first subtransmission and the second subtransmission.

16. The change-speed transmission according to claim 1, further comprising:
   a tenth gear and eleventh gear joint gearwheel set configured to activate a tenth gear and an eleventh gear;
   a fourth gear and fifth gear joint gearwheel set configured to activate a fourth gear and a fifth gear; and
   a first gear and second gear joint gearwheel set configured to activate a first gear and a second gear;
   wherein the change-speed transmission is configured to be shifted between the first gear and the second gear, between the fourth gear and the fifth gear, and between the tenth gear and the eleventh gear by shifting between the third powershift clutch and the second powershift clutch without a subtransmission change.

17. The change-speed transmission according to claim 16, wherein the output spur gear wheel of the reduction gearing is affixed to the input shaft of the second subtransmission;
   wherein a twelfth gear is associated with the first subtransmission;
   wherein each of the eleventh gear and the tenth gear are associated with the second subtransmission; and
   wherein the change-speed transmission is configured to permit direct backshifting from the twelfth gear to the eleventh gear and from the twelfth gear to the tenth gear.

\* \* \* \* \*